US012300199B2

(12) United States Patent
May

(10) Patent No.: US 12,300,199 B2
(45) Date of Patent: May 13, 2025

(54) ENERGY ABSORBING PERCUSSION INSTRUMENT STAND

(71) Applicant: Randall May International Incorporated, Irvine, CA (US)

(72) Inventor: Randall L. May, Irvine, CA (US)

(73) Assignee: Randall May International Incorporated, Irvine, CA (US)

( * ) Notice: Subject to any disclaimer, the term of this patent is extended or adjusted under 35 U.S.C. 154(b) by 227 days.

(21) Appl. No.: 18/066,164

(22) Filed: Dec. 14, 2022

(65) Prior Publication Data

US 2023/0186875 A1 Jun. 15, 2023

Related U.S. Application Data

(60) Provisional application No. 63/289,990, filed on Dec. 15, 2021.

(51) Int. Cl.
| | |
|---|---|
| *G10D 13/10* | (2020.01) |
| *F16M 11/24* | (2006.01) |
| *F16M 11/38* | (2006.01) |
| *G10D 13/14* | (2020.01) |

(52) U.S. Cl.
CPC .......... *G10D 13/28* (2020.02); *F16M 11/245* (2013.01); *F16M 11/38* (2013.01); *G10D 13/14* (2020.02)

(58) Field of Classification Search
CPC ...... G10D 13/28; G10D 13/14; G10D 13/063; F16M 11/245; F16M 11/38; F16M 11/043; F16M 11/2021; F16M 11/28; F16F 6/005
See application file for complete search history.

(56) References Cited

U.S. PATENT DOCUMENTS

| | | | |
|---|---|---|---|
| 7,438,266 B2 | 10/2008 | May | |
| 7,588,228 B2 | 9/2009 | May | |
| 7,703,725 B2 | 4/2010 | May | |
| 7,718,878 B2 | 5/2010 | May | |
| 8,633,365 B2 | 1/2014 | May | |
| 9,377,158 B2 | 6/2016 | May | |
| 9,863,573 B2 | 1/2018 | May | |
| 9,881,595 B2 | 1/2018 | May | |
| 10,167,994 B2 | 1/2019 | May | |
| 10,249,273 B1 * | 4/2019 | May | ...................... G10D 13/28 |
| 10,818,276 B2 | 10/2020 | May | |
| 10,885,888 B2 | 1/2021 | May | |

* cited by examiner

*Primary Examiner* — Kimberly R Lockett
(74) *Attorney, Agent, or Firm* — Crowell & Moring LLP

(57) ABSTRACT

A percussion instrument stand includes an instrument support structure that supports the percussion instrument; a main body that supports the instrument support structure on a support base resting on a surface. The instrument support stand also includes a dampening system that absorbs impact energy transferred to the stand by a user playing the instrument via displacement off of an equilibrium orientation. The dampening system also provides a restoring force that returns the dampening system to the equilibrium orientation.

10 Claims, 4 Drawing Sheets

ENERGY ABSORBING PERCUSSION INSTRUMENT STAND

CROSS REFERENCE TO RELATED APPLICATION

This application claims priority to Provisional Application No. 63/289,990, filed Dec. 15, 2021, the entire contents of which are hereby expressly incorporated by reference herein.

BACKGROUND OF THE INVENTION

This disclosure generally relates to percussion instrument stands, and particularly relates to percussion instrument stands that have impact energy absorbing features.

It is known that, for percussion instruments (e.g., cymbals, drums, etc.) mounted on percussion instrument stands, performance impact energy is introduced and transferred to the stand while the musician is performing. This causes dynamic movement of the instrument and corresponding "walking" or in some cases tipping of the stand, which chances are increased with heavier instruments or harder playing.

Instrument stands for percussion instruments are thus typically made from steel to withstand the performance impact energy introduced and transferred to the stand while the percussionist/drummer is performing. In addition to resisting deformation, the relatively high density and therefore weight of steel also helps to resist the legs of the stand from lifting when played. However, because of various instrument sizes and musician playing strengths, the current solution is to provide increasingly heavier stands with larger legs to increase the radius footprint for added stability. Such stands are inconvenient to transport and cannot be easily set up in small areas due to the relatively large weight and/or footprint factors required for full stability.

It is therefore desirable to provide advantages over such known systems and methods. Other features and advantages of the present invention will become apparent from the following more detailed description, taken in conjunction with the accompanying drawings, which illustrate, by way of example, the principles of the presently described embodiments.

DETAILED DESCRIPTION OF THE PREFERRED EMBODIMENTS

Figure 1:
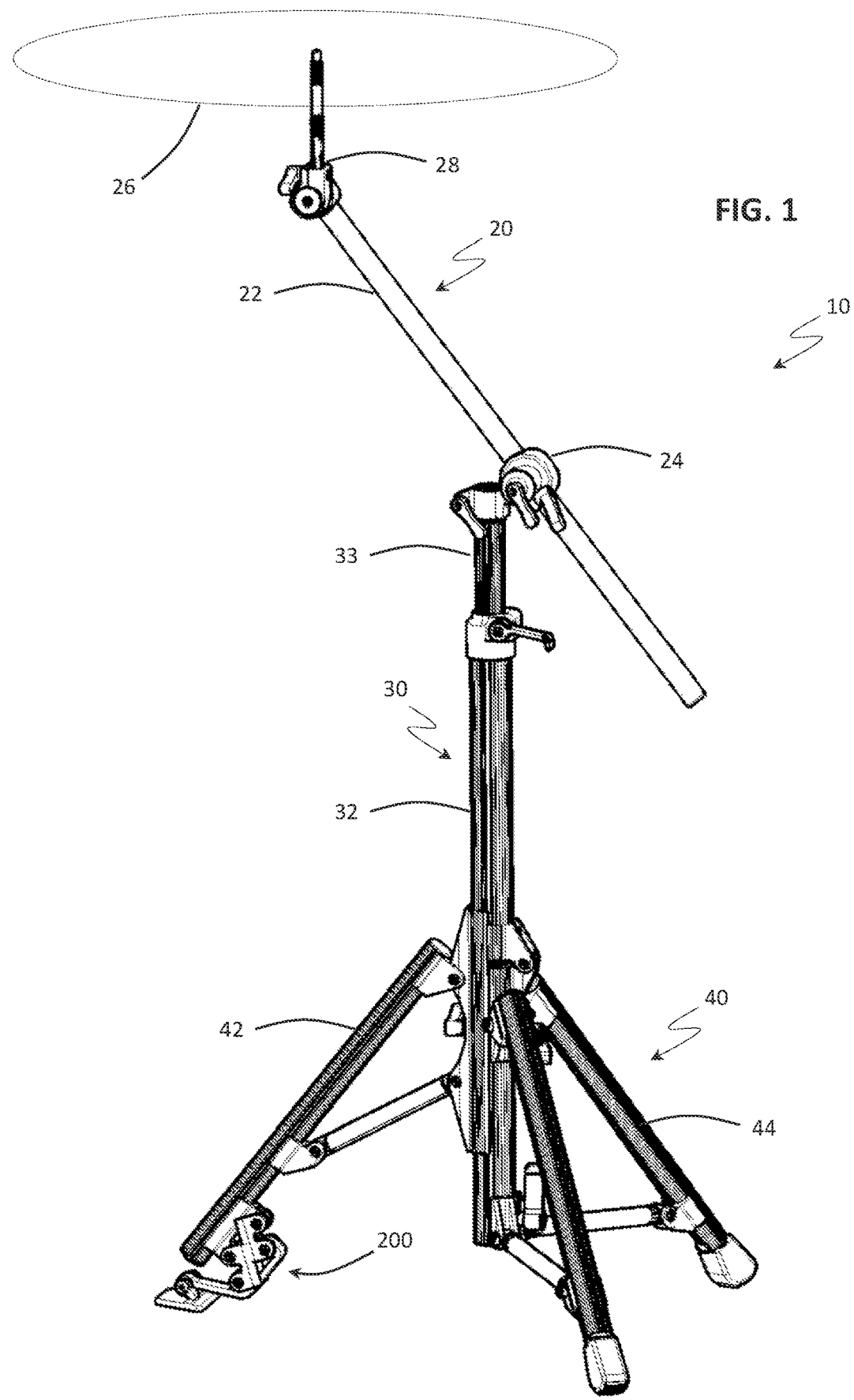
FIG. 1 shows a percussion instrument stand according to at least one embodiment.

The above described drawing figures illustrate the disclosed invention in at least one embodiment, which is further defined in detail in the following description. Those having ordinary skill in the art may be able to make alterations and modifications to what is described herein without departing from its spirit and scope. While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspects of the invention to any embodiment illustrated. Therefore, it should be understood that what is illustrated is set forth only for the purposes of example and should not be taken as a limitation on the scope of the disclosed invention.

FIGS. 1-6 illustrate a percussion instrument stand 10 according to at least one embodiment. The percussion instrument stand includes an instrument support structure 20, a main body 30, and a stand base 40.

The instrument support structure 20 is generally configured to receive an instrument such that the instrument is mounted thereon and thereby supported by the percussion instrument stand 10 via coupling of the instrument support structure 20 to the main body 30 and/or the stand supporting base. The instrument support structure 20 may be, for example, a cymbal stand mount with or without boom arm, a single tom stand mount, a double tom stand mound, and combinations thereof, as well as associated components and/or mechanisms, as known in the art. Exemplary instrument support structures are described in the following patents, the entire contents of which are incorporated herein by reference: U.S. Pat. No. 7,438,266, entitled "Stackable Instrument Stadium Hardware Stand," filed on Jun. 9, 2006; U.S. Pat. No. 7,588,228, entitled "Adjustable Tripod Stand," filed on Jan. 16, 2003; U.S. Pat. No. 7,703,725, entitled "Adjustable Tripod Stand," filed on Jan. 16, 2003; U.S. Pat. No. 8,633,365, entitled "Instrument and Speaker Lift Stand," filed on Dec. 14, 2010; U.S. Pat. No. 9,377,158, entitled "Articulating Amplifier Stand," filed on Dec. 14, 2010; U.S. Pat. No. 9,863,573, entitled "Instrument and Speaker Lift Stand," filed on Feb. 18, 2010; U.S. Pat. No. 9,881,595, entitled "Articulating Amplifier Stand," filed on Feb. 14, 2010; U.S. Pat. No. 10,167,994, entitled "Instrument and Speaker Lift Stand," filed on Sep. 26, 2013; U.S. Pat. No. 10,885,888, entitled "Mechanical Assist Equipment Support Stand," filed on Dec. 14, 2010; and U.S. Pat. No. 7,718,878, entitled "Musical Instrument Stand with Assisted Extension," filed on Jun. 9, 2006 (collectively the "stand patents"). Other instrument support structures, particularly those having magnetic and non-magnetic suspension features, are shown in the following patents, the entire contents of which are incorporated herein by reference: U.S. Pat. No. 10,818,276, entitled "Drum Suspension Apparatus," filed Mar. 4, 2019; and U.S. Pat. No. 10,249,273, entitled "Magnetic Drum Suspension Apparatus," filed Jan. 16, 2018 (collectively, the "suspension patents").

In some embodiments, the instrument support structure 20 may be a cymbal boom system 20 (FIG. 1). The cymbal boom system 20 may generally include a boom arm 22 coupled to the main body 30 via a tilt fastener 24 and to a cymbal 28 via a boom head 26, configured as is generally known in the art. As is also known in the art, the cymbal boom system 20 may support the cymbal 28 in a playing position via the boom arm 22 cantilevered with respect to the main body 30.

The main body 30 is generally configured to support the instrument support structure 20 on the stand base 40. Exemplary main bodies are described in the aforementioned stand patents.

In some embodiments, the main body 30 includes a first tubular member 32 and a second tubular member 33 telescopically adjustable relative to the first tubular member 32. The first tubular member 32 and/or the second tubular member 33 may further house a mechanical assist mechanism (not shown) configured to provide an assisting force to the second tubular member 33 so as to more easily telescopically extend the second tubular member 33 relative to the first tubular member 32. Exemplary mechanical assist mechanisms are described in aforementioned U.S. Pat. No. 7,718,878.

In some embodiments, the main body 30 includes a transport folding system 100 generally configured to allow a user to fold an upper body 110 of the main body 30 onto a lower body 120 of the main body 30 substantially in parallel therewith for compact storage and travel, for example, as shown in FIGS. 1, 4A-4B and 5-6. The transport folding system may accordingly include the upper body 110 coupled to the lower body 120 by a folding hinge 130. Accordingly, the main body 30 may be transitioned between a folded position (FIG. 4B), in which the upper body 110 is displaced substantially parallel to the lower body 120, and an unfolded position (FIG. 1), in which the upper body 110 is substantially coaxial with the lower body 120, and semi-folded positions (e.g., FIG. 4A).

The transport folding system 100 may further include one or more alignment means configured to align the upper body 110 and the lower body 120 so as to be coaxial in the unfolded position. The alignment means may be, for example, one or more: magnets, pins/holes, hooks/loops, snap latches, or any other alignment hardware. In at least one embodiment, the alignment means comprises at least one attractive pair of magnets, whereby the upper body 110 and the lower body 120 are coaxially aligned via the magnetic force resulting from the pair of magnets coming into proximity with each other as the main body 30 transitions to the unfolded position. Accordingly, the alignment means may be positioned at matching locations of the upper body 110 and lower body 120 so as to thereby cause the coaxial alignment.

The transport folding system may further include a locking mechanism 140 configured to securely lock the main body 30 in the unfolded position. That is, the main body 30 is locked in the unfolded position sufficiently secure to not transition out of the unfolded position during normal playing use of the percussion instrument stand 10 (i.e., during playing and while set up to play).

In at least one embodiment, the locking mechanism includes a locking collar 142 that is slideable along the lower body 120 and/or the upper body 110 such that the locking collar 142 can be maneuvered between a locking position and an unlocking position. In the locking position, the locking collar 142 abuts the coaxially aligned lower body 120 and upper body 110 that are in the unfolded position, thereby locking the main body 30 in the unfolded position via the abutment. In the unlocking position, the locking collar 142 has been maneuvered so as to only abut one of the upper body 110 or the lower body 120 (preferably the lower body 120), thereby allowing the main body 30 to transition to the folded position. The locking collar 142 may further be secured in position along the main body 30 via one or more fasteners 144, such as, for example, threaded bolts, snap latches, and other similar hardware.

Figure 5:
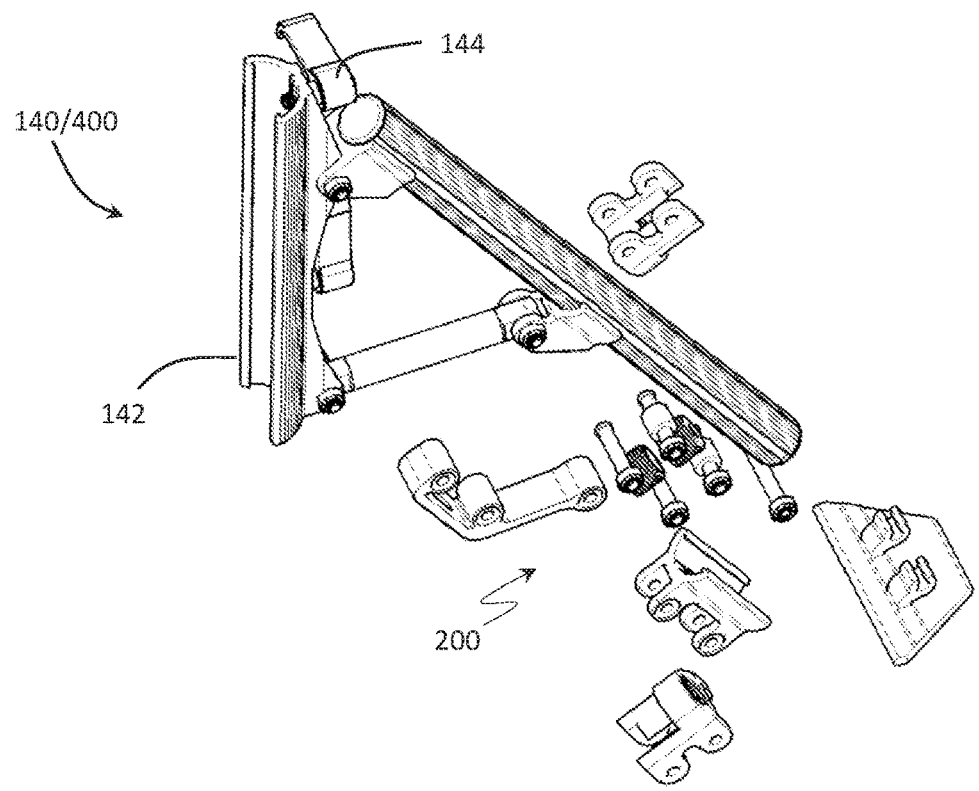
FIG. 5 shows an exploded view of the dampening system and a locking mechanism in accordance with at least one embodiment.
Figure 6:
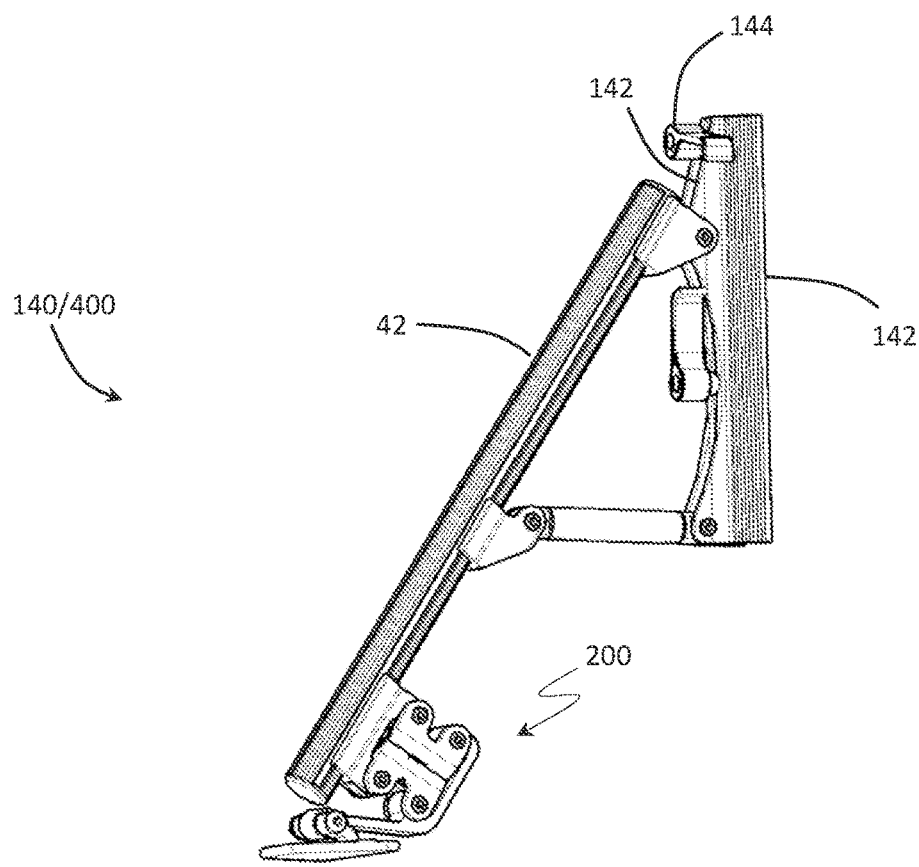
FIG. 6 shows the dampening system and locking mechanism of FIG. 5.

In at least some embodiments, the locking collar 142 may be shaped so as to form a tongue-and-groove connection with the main body 30, which tongue-and-groove connection allows for the aforementioned slidability. For example, the locking collar 142 may be, in whole or in part, c-shaped and may thereby engage corresponding linear grooves of the main body 30 so as to allow for sliding along the lineal grooves (FIG. 5). Additionally, or alternatively, the locking collar 142 may be, in whole or in part, o-shaped with one or more internal protrusions via which the slideable tongue-and-groove connection may be made. Exemplary collars whose principles may be applied to the locking collar are described in aforementioned U.S. Pat. No. 7,703,725.

Turning back to FIGS. 1 and 6, the stand base 40 may include a plurality of support legs 42, 44, in particular three support legs, coupled to main body 30 opposite the instrument support structure 20 so as to support the percussion instrument stand 10 on a surface (e.g., floor, stage, bleacher seat, etc.). Exemplary stand bases are described in the aforementioned stand patents.

In some embodiments, the base 40 includes a longitudinal positioning system 400, via which one or more support legs (e.g., the nose leg 42) are slideably adjustable along the main body 30 so as to change an angle at which the main body 30 is positioned relative to the surface(s) on which the support legs 44 are positioned. Exemplary longitudinal positioning systems are described in the aforementioned stand patents. It will be understood that the locking collar 142 may serve a dual purpose as part of both the transport folding system and the longitudinal positioning system, as will be apparent to those of ordinary skill in the art.

As shown in FIGS. 1-6, in some embodiments, at least one of the support legs includes a dampening system 200, preferably the nose leg 42. The dampening system 200 may be generally configured to absorb impact energy introduced to the percussion instrument stand 10 via playing of the instrument. For example, as the user plays the mounted instrument, the impact energy exerts a tilting force on the percussion instrument stand 10—i.e., a force that tends to cause typical percussion instrument stands 10 to tilt or rock.

Figure 2:
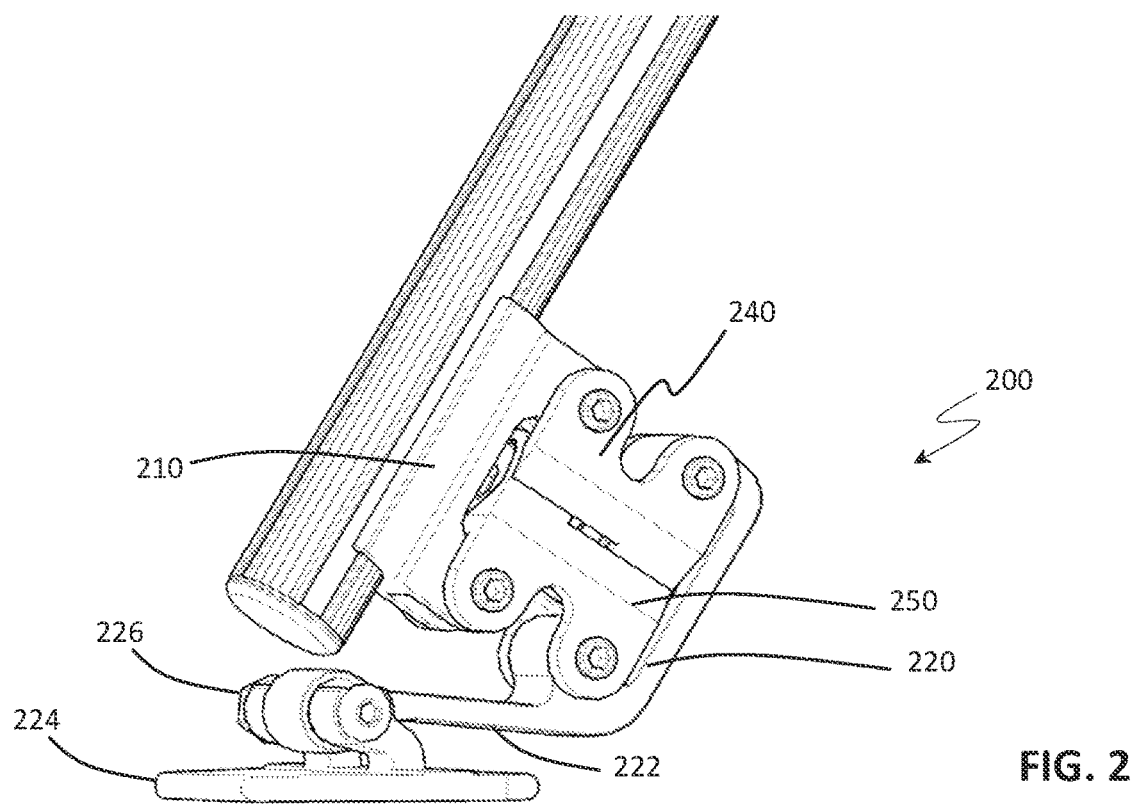
FIG. 2 shows a dampening system according to at least one embodiment.
Figure 3:
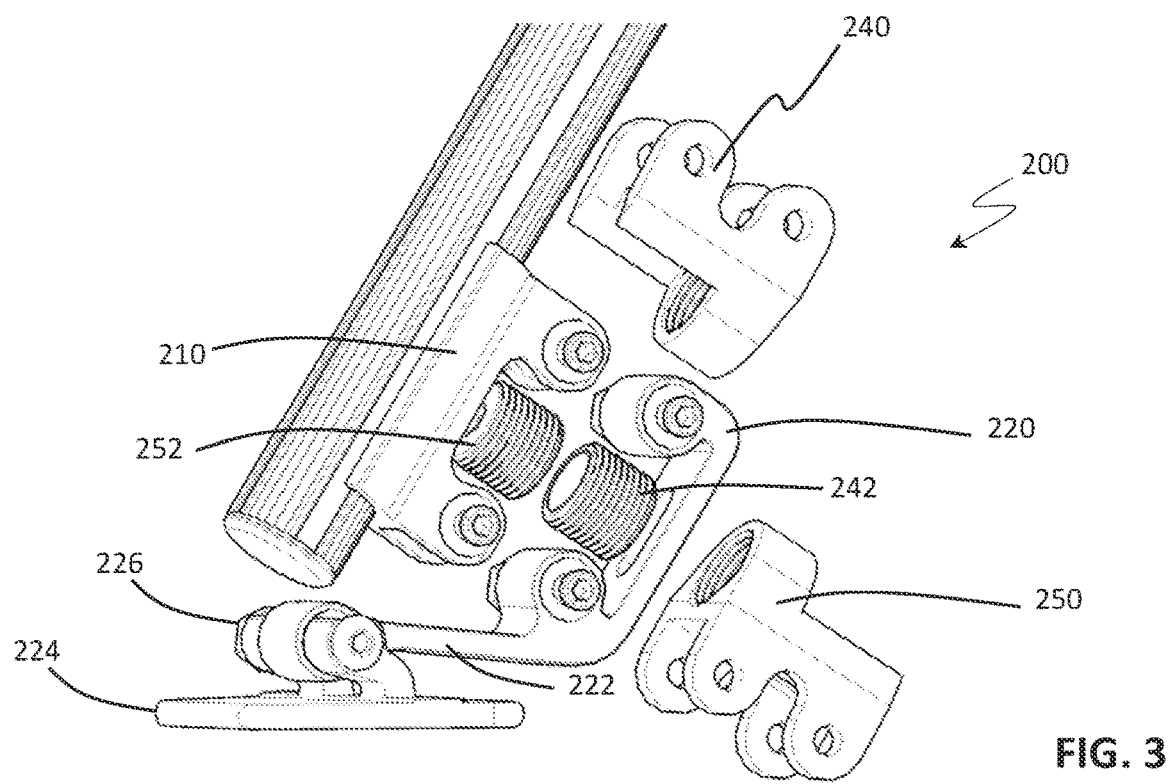
FIG. 3 shows an exploded view of the dampening system of FIG. 2.
Figure 4A:
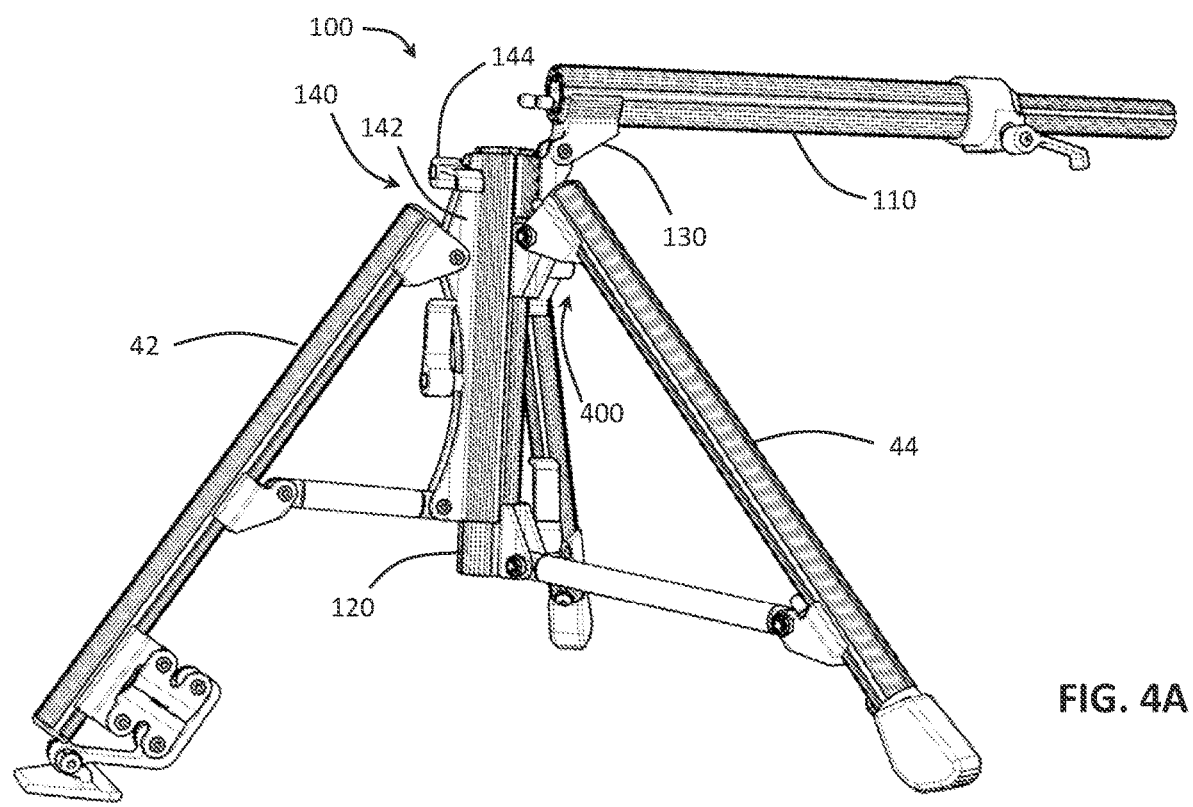
FIGS. 4A-4B show the percussion instrument stand of FIG. 1 transitioning between a folded and unfolded position.
Figure 4B:
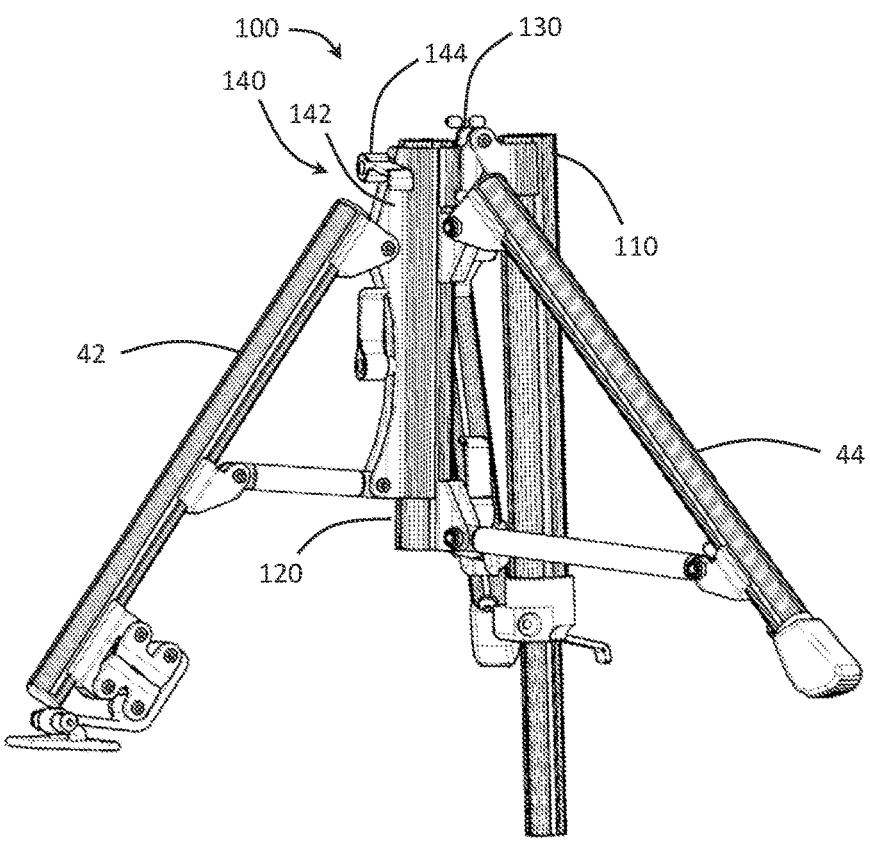

As shown in FIGS. 2-3 and 5, the dampening system 200 may comprise: a leg brace 210 coupled to a swing arm 220 via a first housing 240 and a second housing 250.

The leg brace 210 may be coupled to the support leg (e.g., the nose leg 42) via a c-shaped collar tongue-and-groove type connection, discussed above, so as to be repositionable along the support leg and secured in a desired position thereon. The leg brace 210 may be further coupled to the swing arm 220 via the first housing 240 in a double-hinge connection. That is, an upper end of the leg brace 210 may be hingedly coupled to a proximal end of the first housing 240, and a distal end of the first housing 240 may be hingedly coupled to an upper end of the swing arm 220. The leg brace 210 may be additionally coupled to the swing arm 220 via the second housing 250 in a similar double-hinge connection, with a lower end of the leg brace 210 hingedly coupled to a proximal end of the second housing 250, and a distal end of the second housing 250 hingedly coupled to a lower end of the swing arm 220. Accordingly, the double-hinge connection may be had between the leg brace 210 and the swing arm 220. The swing arm 220 may, in turn, include an arm extension 222 be hingedly coupled to a foot pad 224 via a foot hinge 226.

The first housing 240 and the second magnet housing 250 hold a first magnet 242 and a second magnet 252 in a spaced apart opposing orientation, respectively. That is, the first housing 240 holds the first magnet 242, and the second housing 250 holds the second magnet 252, such that the orientation of the magnets generates a magnetic field that repels the first magnet 242 from the second magnet 252, and vice versa (e.g., north-to-north or south-to-south). The magnets 242, 252 may be held in the respective housing 240, 250 via threaded engagement with the housing 240, 250, such that a space between the magnets can be adjusted, thereby adjusting the magnetic field strength. Accordingly, the magnets 242, 252 may have a threaded outer surface, or may have a threaded outer sheath fixed thereto. The space between the magnets 242, 252 may therefore be adjusted via operation of the threaded engagement similar to a bolt-and-nut arrangement.

The magnetic field generated by the first magnet 242 and the second magnet 252, in combination with the double-hinge connection between the leg brace 210 and the swing arm 220, may also generally provide a restoring force that tends to bring the magnets towards coaxial alignment. Accordingly, when the tilting force is applied in the direction of the support leg, the leg brace 210 becomes displaced relative to the swing arm 220 such that the magnets are moved off of (or are further moved off of) coaxial alignment. In other words, the respective axes of the magnets become more transversely misaligned. The magnets 242, 252 are also displaced such that the space between the magnets (i.e., the distance in the axial direction) is decreased, thereby increasing the magnetic field strength and thus the restoring force, which consequently acts to restore the orientation of the magnets (and other components of the dampening system 200) to equilibrium. It will be further understood that, while an equilibrium where the magnets 242, 252 are coaxially aligned is preferable, off-axis equilibriums are contemplated (e.g., for heavier instruments).

Accordingly, the impact energy may be smoothly absorbed by the magnetic field, and thereby problematic tilting, lifting and/or walking of the percussion instrument stand 10 can be reduced without resorting to heavier materials or wider support leg placement, allowing for more versatility. The percussion instrument stand 10 may therefore be made primarily or in large part of more lightweight materials, such as, for example, aluminum, magnesium, and/or carbon fiber.

In some embodiments, the longitudinal positioning system and the dampening system 200 may utilize the same support leg (e.g., the nose leg 42), Accordingly, the position of the support leg can be adjusted to optimally position the dampening system 200 for impact energy absorption. In some embodiments, this may be substantially in line with the center of mass of the instrument being supported by the percussion instrument stand 10.

It will also be understood that, while embodiments discussed herein are described in the context of a magnetic dampening system, non-magnetic dampening systems may also be used, without departing from the scope of the invention. For example, the magnets may be replaced by springs, bladders, elastomers, or any combination thereof, so as to produce a substantially similar restoring force. In such embodiments, the housings 240, 250 would house and/or be part of the non-magnetic restoring force providing mechanism. Principles of using non-magnetic restoring force mechanisms in lieu of magnetic restoring force mechanism are shown in the suspension patents.

The features described above are considered novel over the prior art of record and are considered critical to the operation of at least one aspect of the invention and to the achievement of the objectives of the invention. The words used in this specification to describe the exemplary embodiments are to be understood not only in the sense of their commonly defined meanings, but also to include any special definition with regard to structure, material or acts that would be understood by one of ordinary skilled in the art to apply in the context of the entire disclosure.

The definitions of the words or drawing elements described herein are meant to include not only the combination of elements which are literally set forth, but all equivalent structures, materials or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim without departing from the scope of the invention.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted in conjunction with the appended claims.

What is claimed is:

1. A percussion instrument stand, comprising:
    an instrument support structure configured to support the percussion instrument thereon;
    a main body configured to support the instrument support structure on a support base resting on a surface; and
    a dampening system configured to absorb impact energy transferred to the stand by a user playing the instrument via displacement off of an equilibrium orientation, and to provide a restoring force that returns the dampening system to the equilibrium orientation, wherein the dampening system includes:
        a leg brace fixed to at least one leg of the support base; and
        a swing arm that is:
            double-hinge coupled to the leg brace by a first housing and by a second housing, and
            single hinge coupled to a foot configured to rest on the surface.

2. The percussion instrument stand of claim 1, wherein the restoring force is a magnetic repulsion force.

3. The percussion instrument stand of claim 1, wherein the impact energy is absorbed by the restoring force.

4. The percussion instrument stand of claim 1,
    wherein the first housing holds a first magnet; and
    wherein the second housing holds a second magnet in a spaced apart opposing orientation to the first magnet so as to generate the restoring force.

5. The percussion instrument stand of claim 4, wherein the equilibrium position corresponds to a substantially coaxial alignment of the first magnet with the second magnet.

6. The percussion instrument stand of claim 5, wherein the displacement is away from the substantially coaxial alignment.

7. The percussion instrument stand of claim 5, wherein the displacement decreases the axial distance between the first magnet and the second magnet.

8. The percussion instrument stand of claim 4, wherein: (a) the first magnet is adjustable within the first housing, and/or (b) the second magnet is adjustable within the second housing, so as to adjust the restoring force.

9. The percussion instrument stand of claim 1, wherein the main body comprises:

an upper body connected to a lower body by a hinge that permits the upper body to fold relative to the lower body into a folded position in which the lower body is substantially parallel to the upper body; and a locking mechanism configured to lock the upper body and the lower body into an unfolded position in which the upper body is coaxially aligned with the lower body.

10. The percussion instrument stand of claim 9, wherein the locking mechanism includes a locking collar that is slideable along the main body and is coupled to the at least one support leg so as to change an angle at which the main body is positioned relative to the surface.

\* \* \* \* \*